(12) United States Patent
Sylvester

(10) Patent No.: US 6,894,092 B2
(45) Date of Patent: May 17, 2005

(54) AQUEOUS ASPHALT EMULSIONS CONTAINING LIQUEFIED OR DEVULCANIZED RECYCLED RUBBER

(75) Inventor: Laurence M. Sylvester, Tiburon, CA (US)

(73) Assignee: RAM Technologies Group, Inc., Reno, NV (US)

( * ) Notice: Subject to any disclaimer, the term of this patent is extended or adjusted under 35 U.S.C. 154(b) by 117 days.

(21) Appl. No.: 10/164,350

(22) Filed: Jun. 5, 2002

(65) Prior Publication Data

US 2003/0018106 A1 Jan. 23, 2003

Related U.S. Application Data

(60) Provisional application No. 60/296,320, filed on Jun. 5, 2001.

(51) Int. Cl.[7] .............................. C08J 3/00; C08K 3/20; C08L 95/00
(52) U.S. Cl. .............................. 524/59; 524/60; 524/64; 524/71
(58) Field of Search .............................. 524/59, 60, 64, 524/71

(56) References Cited

U.S. PATENT DOCUMENTS

| | | |
|---|---|---|
| 3,891,585 A | 6/1975 | McDonald |
| 3,919,148 A | 11/1975 | Winters et al. |
| 4,018,730 A | 4/1977 | McDonald |
| 4,069,182 A | 1/1978 | McDonald |
| 4,085,078 A | 4/1978 | McDonald |
| 4,430,464 A | 2/1984 | Oliver |
| 4,485,201 A | 11/1984 | Davis |
| 4,588,634 A | 5/1986 | Pagen et al. |
| 4,609,696 A | 9/1986 | Wilkes |
| 5,270,361 A | 12/1993 | Doung et al. |
| 5,334,641 A | 8/1994 | Rouse |
| 5,492,561 A | 2/1996 | Flanigan |
| 5,539,029 A | 7/1996 | Burris |
| 5,811,477 A | 9/1998 | Burris et al. |
| 6,653,389 B2 | 11/2003 | Burris et al. |
| 6,706,787 B1 | 3/2004 | Burris et al. |
| 2004/0059028 A1 | 3/2004 | Burris et al. |

*Primary Examiner*—Patrick D. Niland
(74) *Attorney, Agent, or Firm*—Robert D. Buyan; Stout, Uxa, Buyan & Mullins, LLP

(57) ABSTRACT

Non thixotropic, aqueous emulsions prepared from rubber modified asphalt cement (RMAC). The RMAC is prepared by a method whereby recycled tire rubber is liquified or otherwise consumed by or incorporated into asphalt such that no more than 2% by weight of solid particulate rubber remains. The RMAC may be emulsified in an aqueous or partially aqueous emulsification solution using a one-step or multi-step emulsification process. These aqueous RMAC emulsions are useable in many applications including paving, seal coat, roofing and slurry seal applications.

21 Claims, 3 Drawing Sheets

AQUEOUS ASPHALT EMULSIONS CONTAINING LIQUEFIED OR DEVULCANIZED RECYCLED RUBBER

RELATED APPLICATION

This patent application claims priority to U.S. Provisional Patent Application Ser. No. 60/296,320 filed on Jun. 5, 2001, which is expressly incorporated herein by reference.

FIELD OF THE INVENTION

This invention relates generally to asphalt emulsions useful in paving, roofing, coating and other applications, as well as methods for making such asphalt emulsions and products containing such asphalt emulsions.

BACKGROUND OF THE INVENTION

A. Crumb Rubber Modified Asphalts

Crumb rubber obtained from recycled vehicle tires has been mixed with asphalt for various applications for at least 30 years to form various compositions generally referred to as "rubber modified asphalt" or "rubber asphalt cement." In most of the previously known rubber modified asphalts or rubber asphalt cements, the crumb rubber remains in the form of solid particles after it has been combined with asphalt. In general, two (2) types of processes have been used to manufacture rubber modified asphalt or rubber asphalt cement for paving applications, namely the Wet Process and the Dry process.

In the Wet Process particles of crumb rubber are mixed with asphalt cement to form a crumb rubber/asphalt mixture wherein aromatic oils from the asphalt are absorbed into polymer chains of the rubber, thereby causing swelling of the rubber particles. This crumb rubber/asphalt mixture is then combined with aggregate (e.g., pulverized rock, stones or sand) and sometimes other components (e.g., slag, glass, recycled asphalt, etc.) to form a paving composition. The Wet Process typically requires special equipment for blending the crumb rubber and the asphalt to form the crumb rubber/asphalt mixture.

In the Dry Process, the crumb rubber is combined with aggregate (and sometimes other dry components of the paving composition to form a crumb rubber/aggregate dry mixture. Such crumb rubber/aggregate dry mixture is subsequently combined with asphalt to form the desired paving composition.

There have also been attempts to digest, devulcanize, liquefy or chemically modify the crumb rubber prior to or during blending with asphalt to provide a more homogenous, substantially liquid, rubber modified asphalt. These processes include a technique known as the "Terminal Blend Process" wherein crumb rubber is digested into the asphalt at a refinery. The Terminal Blend Process has been used in Texas since about 1995 and is generally understood to be incapable of incorporating as much crumb rubber into the asphalt as the Wet Process or the Dry process.

Various United States Patents have described methods for combining digested, devulcanized, liquefied or chemically modified crumb rubber prior to or during its mixture with asphalt, to form variations of rubber modified asphalt or rubber asphalt cement. For example, U.S. Pat. No. 5,270,361 (Duong et. al.) describes a process for making an asphalt composition which includes synthetic or natural rubber particles of up to one-half inch in thickness. Elemental selenium or an organo-selenium compound is added into the mixture to act as a substitute for the sulfur which is removed during the vulcanization process. The selenium or organo-selenium compound acts as a cross-linking agent. The composition is treated with pressurized air in a dehydrogenation reaction. In the dehydrogenation vessel, the dispersing device includes a pair of discs turning at 3600 rpm which promotes homogenization and acceleration of the dehydrogenation reaction. Elemental selenium or an organo-selenium compound is added into the homogenized composition and mixed in a static mixer. The asphalt composition is then recovered and stored in a container at about 150.degree. to 175.degree. C.

U.S. Pat. No. 4,609,696 (Wilkes) describes a rubberized asphalt composition wherein asphalt is combined with a hydrocarbon oil to provide a homogenized asphalt-oil mixture. Such asphalt-oil mixture is then combined with solvent-dispersed particulate rubber to provide a homogenous gel. This gel may then be emulsified by passing the asphalt-rubber-oil gel, with water, through a colloid mill.

Also, U.S. Pat. No. 4,430,464 (Oliver) describes a pavement binder composition in which rubber particles are digested in a bituminous material.

U.S. Pat. No. 4,588,634 (Pagen et al.) describes a roofing material using bitumen and ground tire rubber together with mineral stabilizer and an elastomeric polymer composition.

U.S. Pat. No. 5,334,641 (Rouse) describes a rubber modified asphalt for use as a paving compound which is formed by reacting ground rubber, of 50 mesh or finer, with paving grade asphalt and mixing the combination at 300.degree.–400.degree. F. The mixture reacts fully within 25 minutes or less to form a freely pouring mixture and can be held at normal asphalt working temperatures for at least 96 hours without degradation.

U.S. Pat. No. 4,485,201 (Davis) describes a method of modifying asphalt with a mixture of ground rubber and synthetic rubber. The compositions include oils and antioxidants in addition to asphalt and rubber. The processing takes place below 375.degree. F.

U.S. Pat. No. 4,085,078 (McDonald) describes a paving material formed by heating a mixture of paving grade asphalt and a non-oil resistant rubber to a temperature of about 360° F.–500° F. The asphalt rubber mixture is diluted with a diluent prior to reaction to form a gelled reaction product. McDonald, U.S. Pat. No. 4,069,182, also describes a hot gelled composition which can be applied to cracked or distressed pavements to repair such pavements. McDonald, U.S. Pat. No. 3,891,585, describes a similar hot gelled composition for repairing pavements.

U.S. Pat. No. 4,018,730 (McDonald) describes thixotropic emulsions prepared from rubber modified asphalt gel. The rubber modified asphalt gel is prepared by processing 20–50% particulate rubber with asphalt at temperatures above 350° F. The emulsion is then created by admixing an asphalt-soap to the rubber modified asphalt gel, thereby forming a thixotropic emulsion.

U.S. Pat. No. 3,919,148 (Winters et al.) describes an elastomeric paving material prepared from asphalt, rubber and an asphalt solvent to form a hot, thick, viscous, gelled composition.

U.S. Pat. No. 5,492,561 (Flanigan) describes a process for liquefying tire rubber known as the TRMACS process. In the TRMACS process, crumb rubber and the asphalt are heated to temperatures of approximately 500° F. under carefully controlled conditions. As a result, the crumb rubber becomes liquified, hydrogen sulfides and mercaptans evolve and the large insoluble polymer molecules of the rubber break into smaller thermoplastic molecules. These thermoplastic molecules are then adsorbed onto the maltenes or other components of the asphalt, providing a homogenous modified asphalt composition in which the rubber has been fully incorporated.

The entire disclosures of each of the above-mentioned United States Patents are expressly incorporated herein by reference.

B. Asphalt Emulsions

For many applications, asphalt is combined with water and a small amount of a surface active agent known as an emulsifier. Such mixture is then run through a device known as a colloid mill which shears the asphalt into tiny droplets. Due to the presence of the emulsifier, the tiny asphalt droplets remain dispersed throughout the water in a stable suspension known as an aqueous asphalt emulsion.

Asphalt emulsions are classified into three categories; anionic, cationic, or nonionic. The anionic and cationic classes refer to the electrical charges surrounding the asphalt particles. Asphalt emulsions have been used in a variety or products including driveway sealers, roofing repair materials, caulks, mastics, crack fillers and in paving materials such as seal coats, chip seals and slurry seals. In some instances, a polymer latex such as styrene-butadiene-rubber latex (SBR latex) is added to the aqueous asphalt emulsion to provide a "polymer modified" asphalt emulsion. Such polymer modified asphalt emulsions are desirable in certain applications such as slurry seal paving applications where it is desired for the asphalt emulsion to have improved physical properties such as better adhesion to particles of aggregate and/or to an underlying surface, better water resistance, better thermal stability, higher softening temperature, etc.

Asphalt Emulsion Slurry Seals are typically used for sealing and repairing roads, drive ways, parking lots and other black topped surfaces. Generally speaking, slurry seals are produced by combining an aqueous asphalt emulsion mixture (e.g., asphalt, water, emulsifier(s) and sometimes other additives (e.g., polymer modifiers, thickeners, surfactants, fillers) with aggregate (e.g., stones or sand) to form a slurry. This slurry is then dispensed onto a paved surface to form a new top layer or coating on the paved surface. In many applications, the aqueous asphalt emulsion mixture is pumped into a mixing apparatus known as a "pug mill" that is mounted on a slurry mixing truck. The aggregate is dispensed into the pug mill where it becomes combined with the liquid asphalt emulsion mixture to produce a slurry. The slurry then flows from the pug mill into a mixing box which travels just behind the slurry-mixing truck. The slurry then is spread from the mixing box onto the underlying paved surface.

Fillers, such as polymer fiber, paper or rubber particles (e.g., crumb rubber obtained from recycled vehicle tires) may also be contained in the slurry seal. Slurry seals that contain crumb rubber are often referred to as "rubberized" slurry seals. They differ from the above-described rubber modified asphalt or rubber asphalt cement in that the rubber particles are not incorporated into the asphalt prior to its emulsification, but rather are combined with the aqueous asphalt emulsion and other components to form an asphalt emulsion mixture which contains solid rubber particles. For example, U.S. Pat. No. 5,539,029 (Burris) and U.S. Pat. No. 5,811,477 (Burris, et. al.) describe asphalt emulsion mixtures that contain solid rubber particles as well as certain slurry seal compositions that are prepared by mixing such solid rubber particle-containing asphalt emulsion mixture with aggregate. In applications such as the above-described "truck mixed" application where it is necessary for the asphalt emulsion mixture to be passed through a pump, the inclusion of solid rubber particles (or other solid fillers such as polymer fibers, clay, etc.) can be problematic in that the rubber particles or filler particles can form clumps and can cause clogging of the pump, especially when the asphalt emulsion mixture is allowed to cool to ambient temperatures below about 55° F. Also, the inclusion of solid rubber particles (or other solid fillers such as polymer fibers, clay, etc.) in the aqueous asphalt emulsion mixture can cause increased wear to pumps, thereby requiring frequent replacement or rebuilding of the pumps.

Also, the inclusion of solid rubber particles in slurry seals can be problematic after the slurry seal has been applied. For example, in some applications the rubber particles may separate or "ravel" from the slurry seal coat.

There exists a need in the art for the development of methods for producing substantially liquid, non-thixotropic aqueous asphalt emulsions which incorporate recycled tire rubber (or break-down products of such tire rubber) but contain little or no (e.g., less than 2% by weight) solid particulate rubber. There is also a need in the art for the development of products such as driveway sealers, roofing repair materials, caulks, mastics, crack fillers and in paving materials such as seal coats, chip seals and slurry seals which contain substantially liquid, non-thixotropic aqueous asphalt emulsions which incorporate recycled tire rubber (or break-down products of such tire rubber) but contain little or no solid particulate rubber.

SUMMARY OF THE INVENTION

In accordance with the present invention, non-thixotropic emulsions of rubber modified asphalt cement (RMAC) are prepared. First a RMAC is prepared by combining 45 to 90% by weight asphalt with 10 to 55% by weight solid recycled rubber under conditions that cause at least a substantial portion of the solid rubber to become liquified or otherwise incorporated into the asphalt so that the resultant RMAC contains no more than about 2% by weight, and preferably substantially no, residual solid rubber. Preferably, the solid rubber is not swelled or mixed with solvent prior to its incorporation into the asphalt. Thereafter, the RMAC is mixed with water, at least one emulsifying agent and optionally other ingredients (e.g., polymer latex, thickener, pH adjuster, pH stabilizer, surfactant, anti-foam agent, colorant, pigment, carbon black, filler, etc.) under conditions which result in emulsification of the rubber modified asphalt cement within the water or aqueous phase to from an emulsion. During preparation the RMAC may be prepared by the method described in U.S. Pat. No. 5,492,561 (Flanigan), which is expressly incorporated herein by reference. The water, emulsifier and optional ingredients may be combined into a single emulsification solution. In instances where one or more of the optional ingredients is not water soluble, such may be suspended or carried in the emulsification solution such that an emulsification solution with suspended solid matter is formed. However, in many applications it is desirable that the RMAC emulsions of this invention be prepared without solid matter or solid components (e.g., bentonite clay, etc.) thereby avoiding limitations and problems associated with the use of asphalt emulsions which contain substantial amounts of solid material.

Further in accordance with this invention, RMAC emulsions of the foregoing character may be combined with aggregate (e.g., Type I, II, II, fines) to form a paving compositions such as a slurry seal compositions. Paving compositions made with the RMAC emulsions of this invention will avoid the problems that can be associated with paving compositions that contain substantial amounts of solid particulate rubber, while still complying with state and/or Federal guidelines or incentives calling for use of substantial amounts of recycled tire rubber in paving compositions.

Still further in accordance with this invention, a non-thixotropic RMAC emulsion may be produced by mixing a) about 45% to 75% by weight of a RMAC which has incorporated or used up between 10 and 25 PBW rubber from recycled sources such that no more than 2% by weight of solid rubber remains in the RMAC with b) between about 25% and 55% of an emulsion solution which comprises i) between 75 and 87 pbw water, between about 0.5 and 10 pbw polymer latex, iii) between about 0 and 1.0 pbw of a rheological agent or thickener, iv) between about 13 and 20 pbw of an anionic, cationic or nonionic emulsifier and between about 0 and 3 pbw of a pH modifier.

Still further in accordance with this invention, the RMAC emulsions may be formed in a single step process by co-milling the RMAC with water, emulsifier and any other optional aqueous or non-aqueous components in a colloid mill. Alternatively, such RMAC emulsions may be prepared in a multistep process where the RMAC, water, emulsifier and any optional aqueous or non-aguenous components may be initially combined in one or more dispersion vessels (e.g., a blade mixer and/or a dispersion mill) equipped with mixer(s) capable or pre-dispersing the RMAC throughout the aqueous phase and subsequently circulated though a colloid mill or media mill to create the desired emulsion. In some cases the mixture may be recirculated from the colloid mill or media mill back through the dispersion vessel one or more times until the desired emulsion consistency is reached. In many applications, the desired emulsion consistency will be reached when the droplets of RMAC are about 2–20 microns in diameter and evenly dispersed throughout the aqueous phase.

Still further in accordance with this invention, RMAC emulsions of the foregoing character may be combined with polymers, pigments, paints, metal powders or other components to provide compositions useable for many applications wherein asphalt emulsions have typically been used, including but not limited to roofing, flooring, truck bed lining, coting of surfaces, lining of cargo holds on ships or barges, seal coats, crack fillers, etc.

Further aspects and advantages of this invention will be discerned by those of skill in the art upon reading and understanding of the following detailed description and the accompanying drawings and figures.

DETAILED DESCRIPTION AND EXAMPLES

Figure 1:
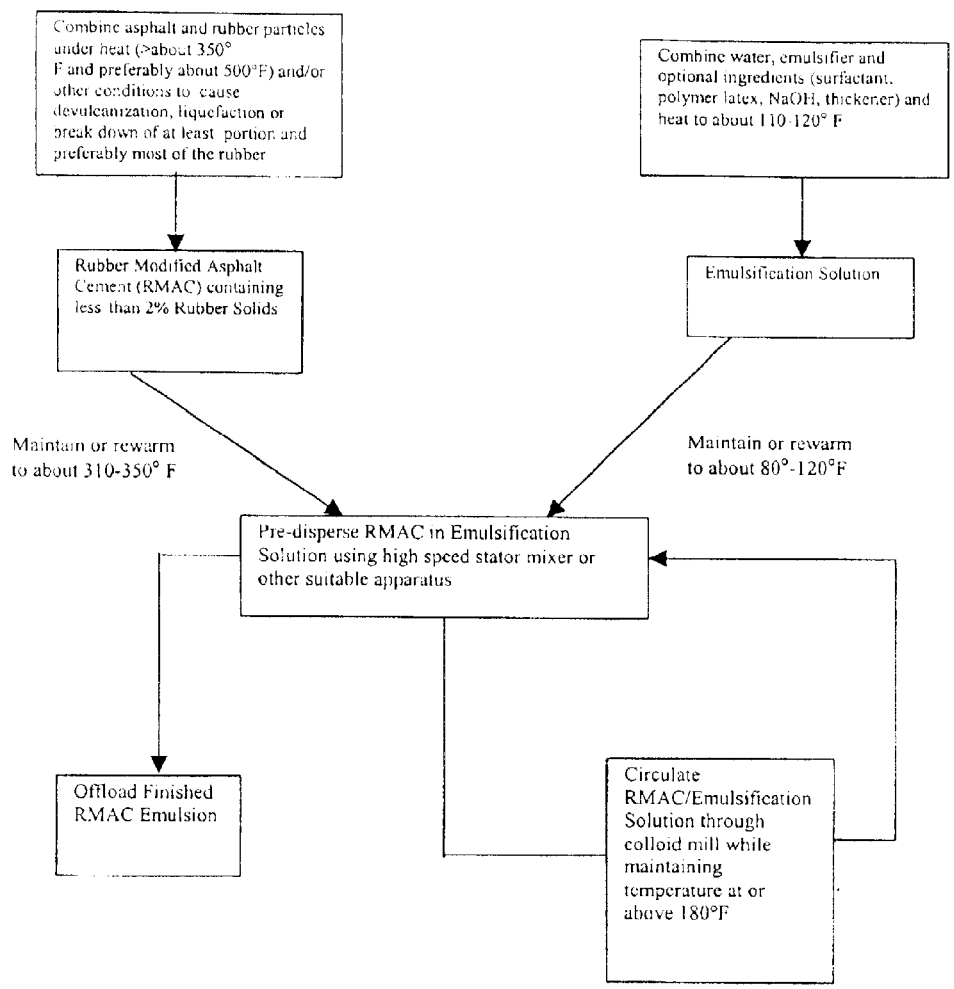
FIG. 1 is a flow diagram showing an example of a dual step process for making RMAC emulsion according to the present invention.

The following detailed description, and the accompanying drawings to which it refers, are provided describing and illustrating certain examples or specific embodiments of the invention only and not for the purpose of exhaustively describing all possible embodiments and examples of the invention. Thus, this detailed description does not in any way limit the scope of the inventions claimed in this patent application or in any patent(s) issuing form this or any related application.

Preferably, the emulsions of the present invention have the following general formula:

| Component | % By Weight |
|---|---|
| Rubber Modified Asphalt Cement (RMAC) (e.g., MAC10-TR) | 45–65 |
| WATER | 21.3–52.95 |
| EMULSIFIER (e.g., Indulin-SAL) | 2–6 |
| NaOH | 0.05–0.2 |
| SURFACTANT (e.g., DDBSA) | 0–0.5 |
| Polymer Latex (e.g., NS-175) | 0–4 |
| THICKENING AGENT (e.g., Tychem 68710) | 0–3 |

These preferred emulsion contain little or substantially no particulate rubber and may be useable in many applications without the need for inclusion of other solid materials such as clay, talc, polymer fibers, etc.

Preparation of Rubber Modified Asphalt Cement (RMAC)

Preferably, the RMAC used in this invention is made by combining particulate rubber with asphalt under heat (e.g., temperature in excess of 350° F. and preferably about 500° F.), pressure and/or other conditions (e.g., in the presence of chemicals that cause devulcanization, liquefaction or break-down of the rubber) which result in a substantial amount of the solid rubber being liquified or otherwise subsumed or incorporated into the asphalt, such that a resultant RMAC is produced which contains no more than about 2% by weight solid rubber, and preferably substantially no solid rubber. One particular RMAC for use in the invention is a product known as MAC10-TR available commercially from Paramount Chemical Company, Inc. of Paramount, Calif. MAC-10TR is a rubber modified asphalt cement manufactured by the TRMACS process described and claimed in U.S. Pat. No. 5,492,561 (Flanigan) entitled "Process for Liquefying Tire Rubber and Product Thereof," which is expressly incorporated herein by reference. In this TRMACS process, crumb rubber and asphalt are heated to high temperatures (e.g., temperatures of approximately 500° F.) under carefully controlled conditions, causing the crumb rubber to liquify. In this process, asphalt may be introduced into a reactor vessel and non-solvent-treated, non-pre-swelled, whole tire solid rubber particles may then be introduced into the asphalt to form a mixture of the asphalt and rubber particles within the reaction vessel. Part of such mixture may then be circulated from a middle portion of the reactor vessel into a bottom portion of the reactor vessel, through jet spray nozzles as described in U.S. Pat. No. 5,492,561 (Flanigan), until the tire rubber particles become fully incorporated into the asphalt, thereby forming the RMAC. During this process, the temperature of the mixture may be maintained sufficiently high to facilitate liquefaction or break-down and incorporation of the rubber into the asphalt. For example, a temperature of 500° F. may be used. In at least some instances, the rubber/asphalt mixture is circulated from the reactor vessel through a heat exchanger to increase temperature of the asphalt medium to about 500° F. Preferably, hydrogen sulfides and mercaptans evolve from the rubber as it undergoes this treatment and the large insoluble polymer molecules of the rubber break into smaller thermoplastic molecules. These thermoplastic molecules are then adsorbed onto the maltenes of the asphalt, providing a homogenous modified asphalt composition in which the rubber has been fully incorporated. The RMAC prepared by this process is substantially free of rubber particles, as substantially all of the recycled rubber is devulcanized and the thermoplastic product of such vulcanization reacts with the asphalt to form a new chemical entity. The properties of this preferred MAC10-TR are as follows:

| | |
|---|---|
| Content Derived From Recycled Tire Rubber (ASTM D2042)Solubility in Trichloroethylene (ASTM D2042). Penetration (ASTM D5) | 12.4% to 14.7% 97.5% (min.) |
| @ 4° C. | 20 dmm |
| @ 25° C. | 40 to 60 dmm |
| Dynamic Viscosity @ 60° C. (ASTM D2171) | 5000 poise (min.) |
| Kinematic Viscosity @ 135° C. (ASTM D2170) | 100 centistokes (max.) |
| Flash Point-Cleveland Open Cup (ASTM D92) | 232° C. |
| Softening Point (ASTM D36) | 53° C. (min) |

The prepared RMAC may then be maintained at temperatures of about 310–375° F. until it is subsequently combined with other formulation components as described below. Alternatively, this RMAC may be allowed to cool below 310° F. and subsequently reheated to about 310–375° F. before is combined with other formulation components as described herebelow.

Preparation of Emulsifying Solution

All components of the emulsion other than the RMAC (i.e., water, emulsifier and optional aqueous and non-aqueous components) may be combined into a single emulsification solution.

The particular emulsifier(s) used will determine whether the RMAC emulsion is anionic, cationic or nonionic. In anionic emulsions, such as that of the preferred formulation set forth above, the emulsion will typically be classified according tot he rate at which the RMAC droplets will settle out of the aqueous phase to form a film. The classifications assigned in this regard are; SS (slow setting), MS (medium setting), or AQS (quick set). Anionic emulsifiers that may be used are well known in the art, including petroleum sulfonates such as alphaolefin sulfonates or sulfates, soap-type emulsifying agents, typically the alkali metal salts of higher fatty acids such as lauric, myristic, palmitic, oleic, ricinoleic and linoleic acids, or mixtures of acids available from animal or vegetable oils, rosin acid soap or other sulfonated lignin derivatives or lignin based emulsifiers (e.g., Indulin SAL, Westvaco, Charleston, S.C.; Vinsol, Hercules Chemical Corporation, Wilmington, Del.).

Non-ionic emulsifiers that may be used are also well known in the art, and include long chain polyoxyethylene or polyoxypropylene groups in fatty acid, alcohol, amide, or amine molecules. These emulsifiers do not ionize but acquire their hydrophilic characteristics from oxygenated side chains, i.e., polyoxyethylene or polyoxypropylene chains combined with the oil-soluble fatty acid, alcohol amine or amide component of the molecule.

In instances where the RMAC emulsion is cationic, such emulsion will typically be classified by its rate of settling by the designations CSS, CMS or CRS. Various cationic emulsifiers that may be used are well known in the art and include amines, quatinary ammonium halides, alkyl-substituted imidazolines, and others described in U.S. Pat. No. 4,298, 397, which is expressly incorporated herein by reference.

One of the optional components is polymer latex. Polymer latex is likely to be included in RMAC emulsions intended for use in paving applications, roofing applications and other applications wherein enhanced adhesion, water resistance or other physical properties are desired. Such polymer latex will typically comprise a rubber or elastomeric latex in which globules of rubber or elastomer are suspended in an aqueous medium. The preferred polymer latex is styrene-butadiene rubber latex or "SBR latex" such as those commercially available as NS175 (BASF Corporation, Mount olive, N.J.), Petrolatex S62 (Petroflex Industria Commercio S/S, Duque de Caxias, RJ Brazil). Other rubbers or elastomers that have been purportedly useable in these polymer latexes include neoprene and natural rubber, acrylics, vinylacrylics, acrylic terpolymers, nitrile, polyvinyl alcohol, polyvinyl acetate, vinyl acetate-ethylene, vinyl ester copolymers, ethylene vinyl chloride, polyvinylidene chloride, butyl rubber, acrylonitrile-butadiene, polyurethanes, silicones, and block copolymers such as styrene-isoprene (SIS), styrene-ethylene-vinyl acetate (SEVAS) and styrene acrylate. It will be understood by those of skill in the art hat the polymer latex need not necessarily be included in the emulsification solution before the emulsification step. Rather, in some instances, some or all of the desired polymer latex may be post added to the RMAC emulsion after the emulsion has been prepared.

Other optional components of the RMAC emulsion are surfactants. Many surfactants useable in asphalt emulsions are well known in the art. Examples of such surfactants include dodecyl benzenesulfonic acid (DDBSA, Pilot Chemical, Inc., Santa Fe Springs, Calif.) and a non-ionic surfactant containing 50% ethylhexanol (Surfonol 104A, Air Products Co., Allentown, Pa.).

Other optional components of the RMAC emulsion are thickeners including but not limited to associative thickeners, polyurethanes, nonionic surfactants, alkali swellable latex thickeners (SB Copolymer Latex, Tychem 68710, Reichold Chemical Corp., White Plains, N.Y.), cellulose, cellulose derivatives, modified cellulose products, plant and vegetable gums, starches, clays, alkyl amines, polyacrylic resins, carboxyvinyl resins, polyethylene maleic anhydrides, polysaccharides, acrylic copolymers (e.g., R2E146, Specialty Polymers Co., Woodburn, Oreg.) and others known in the art. Portland cement and/or hydrated lime may also be used as thickeners in some RMAC emulsions, such as those which are cationic or non-ionic. As those of skill in the art will understand, Portland cement and/or hydrated lime may also be post added to some RMAC emulsions of the anionic type to act as set initiators.

Another optional component of the RMAC emulsion is an anti-foam agent. If needed, an antifoam (e.g., DowAnti-Foam 1400 or DowAnti-Foam Component A available from Dow Chemical Company, Midland, Mich. or Surfynol 104A available from Air Products Corporation) may be added to the emulsification solution or may be post added to the RMAC emulsion. Typically, about 0.0025–0.05% by weight of the anti-foam agent may be included in the emulsification solution.

Preparation of RMAC Emulsion

The RMAC is heated to, or has been maintained at about 310–375° F. (preferably about 310–350° F.). Such heated RMAC is then combined with the emulsifying solution that has been pre-heated to or maintained at approximately 80–120° F. This RMAC/Emulsification Solution mixture is then milled or otherwise mixed in a manner that shears the RMAC into droplets and forms the RMAC emulsion. This emulsification of the RMAC/Emulsification Solution mixture is preferably carried out by either a dual step process (FIGS. 1 and 3) or a single step process (FIG. 2).

Figure 3:
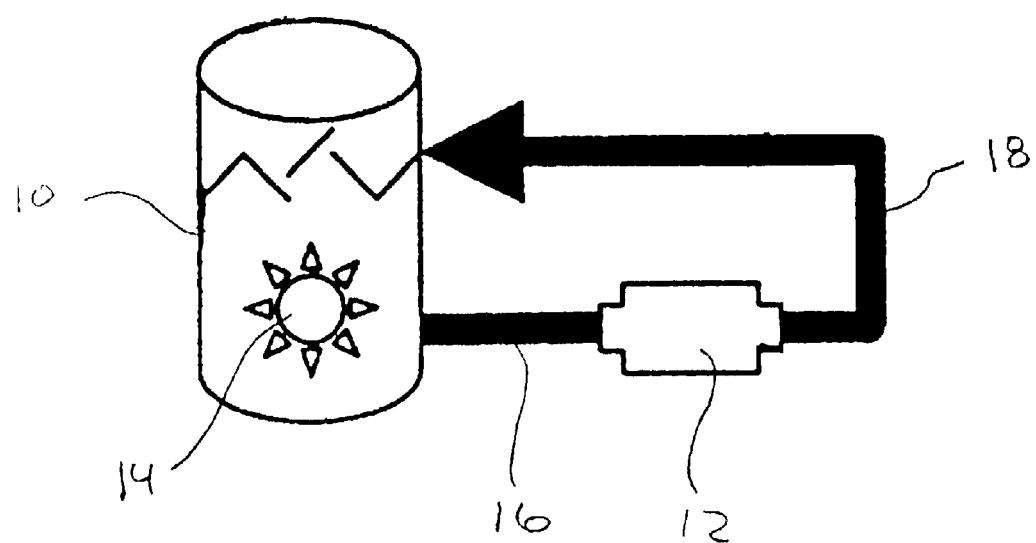
FIG. 3 is a schematic diagram of a system that is useable in connection with the dual step emulsification process shown in FIG. 1.

With reference to FIGS. 1 and 3, in the dual step emulsification process, the Emulsification Solution at about 80–120° F. is placed in a high speed dispersion vessel 10 that is equipped with a mixer 14, such as a rotor-stator type blade type mixer. The RMAC at a temperature of about 310–375° F. is then added to the Emulsification Solution and the mixer 14 is used to pre-disperse the RMAC throughout the Emulsification Solution. A first line 16 fluidly connects the dispersion vessel 10 to the input end of a colloid mill 12 and a second line 18 fluidly connects the output end of the colloid mill 12 to the dispersion vessel 10. The RMAC/Emulsification Solution mixture is thus recirculated from the dispersion vessel 10, through line 16, through the colloid mill 12, through line 18 and back into the dispersion vessel 10. The positive displacement of the colloid mill serves to propel the mixture through this recirculation path. The mixer 14 and the colloid mill continue to run and the recirculation of the mixture is continued until the emulsion has reached the desired consistency (e.g., when the size of the RMAC droplets in the emulsion are about 2–20 microns in diameter). The dispersion vessel/mixer 10/14, colloid mill 12 and related recirculation lines 16, 18 may be purchased commercially as a system, such as the Kady In-line Continuous High Speed Mills available from Kady, Inc.

Figure 2:
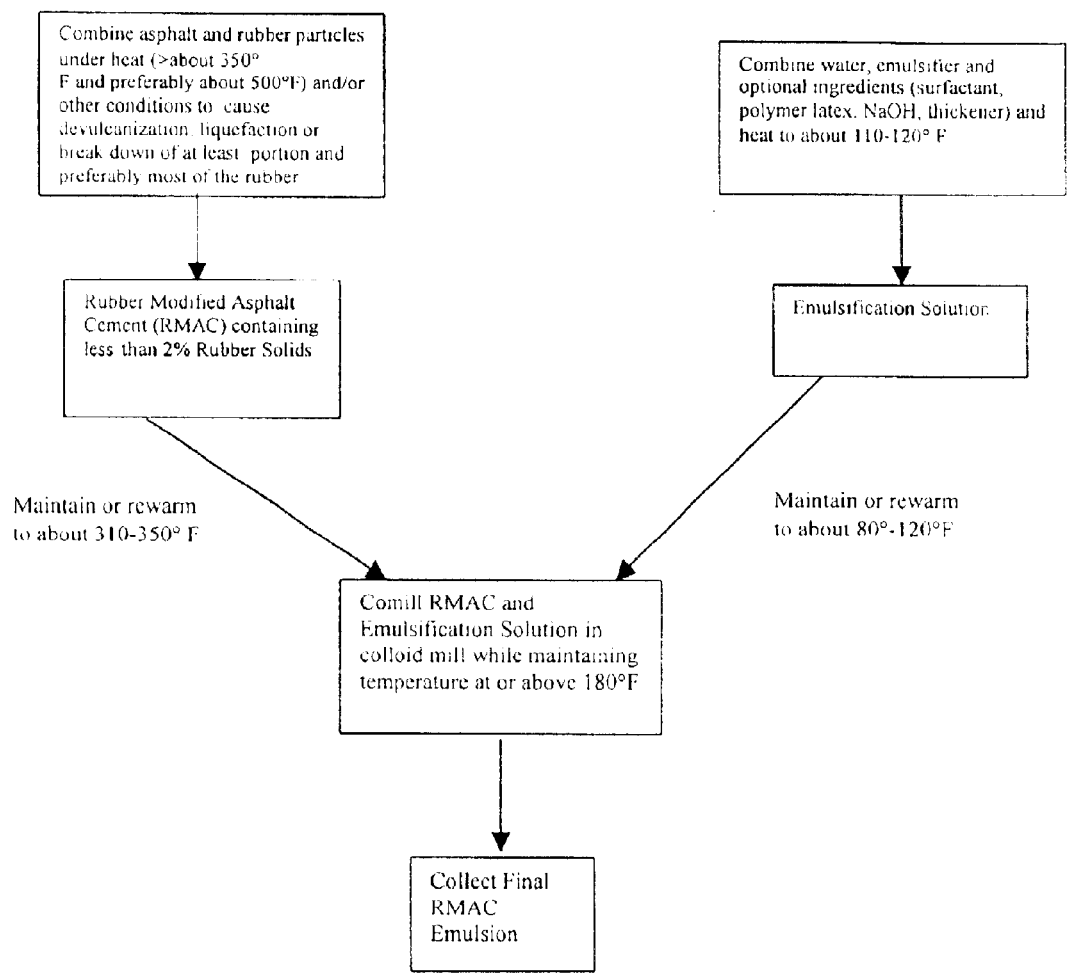
FIG. 2 is a flow diagram showing an example of a one step process for making RMAC emulsion according to the present invention.

Alternatively, as shown in the flow diagram of FIG. 2, a single step emulsification process may be used wherein the RMAC at a temperature of about 310–375° F. and the Emulsification Solution at a temperature of about 80–120° F. are comilled in a single pass through a colloid mill. One commercially available colloid mill useable for this process is the Charlotte G-75 available from Chemicolloid Laboratories, Inc., Garden City park, N.Y.

Preparation of Slurry Seals from RMAC Emulsion:

In addition to many other types of products in which the RMAC emulsion may be incorporated, such RMAC emulsion may be combined with aggregate (e.g, fines, Type I, II or III) to form a slurry seal composition for application to roads, parking lots and other paved surfaces. For example, when a RMAC emulsion of the above general formulation are used, approximately 12–35 pounds per gallon of aggregate may be mixed with the RMAC emulsion in either a central mix process or a truck mixed process. In the central mix process, the RMAC emulsion and the aggregate are combined in a blend tank or vessel and a mixer is used to create a homogenous suspension of the aggregate in the RMAC emulsion. In the truck mixed process, the emulsion mixture and the aggregate are pumped or metered into a truck mounted mixing apparatus known as a "pug mill" where the RMAC emulsion and the aggregate become combined in a homogenous slurry. Such slurry then flows from the pug mill into a mixing box which travels just behind the slurry-mixing truck. The slurry then is spread from the mixing box onto the underlying paved surface.

In slurry seal applications and/or other product applications wherein the RMAC emulsion is a component, various other components or additives may be used in accordance with the known formulation techniques for such products. For example, in slurry seal applications, additional water or other additives (e.g., Portland cement, calcium carbonate, Aeonium sulfate, lime, etc.) Other fillers, such as polymer fiber, paper or rubber particles may also be contained in the slurry seal. Examples of additives that may be included in slurry seals of this invention are described in U.S. Pat. No. 5,539,029 (Burris) and U.S. Pat. No. 5,811,477 (Burris, et. al.), which are expressly incorporated herein by reference.

Although exemplary embodiments of the invention and specific examples have been described, various changes, modifications and substitutions may be made by those having ordinary skill in the art without necessarily departing from the spirit and scope of this invention. Specifically, elements or attributes described in connection with one embodiment or example may also be used in connection with any another embodiment or example provided that the inclusion or use of such element or attribute would not render the embodiment or example in which it is incorporated unuseable or otherwise undesireable for an intended application. Accordingly, all such changes, modifications and substitutions to the above-described embodiments and examples are to be included within the scope of the following claims.

What is claimed is:

1. A method for preparing an nonthixotropic aqueous emulsion of rubber modified asphalt cement, said method comprising the steps of:
   A. A preparing a rubber modified asphalt cement by combining 45 to 90% by weight asphalt with 10 to 55% by weight solid rubber particles under conditions that cause at least a substantial portion of the solid rubber to become liquified so that the resultant rubber modified asphalt contains no more than about 2% by weight residual solid rubber; and,
   B. mixing the rubber modified asphalt cement from Step A at a temperature of at least 310° F. with water and at least one emulsifying agent under conditions which result in formation of an emulsion.

2. A method according to claim 1 wherein Step A comprises heating at least the solid rubber particles such that the resultant rubber modified asphalt has a temperature in excess of about 350° F.

3. A method according to claim 2 wherein Step A comprises heating at least the solid rubber particles such that the resultant rubber modified asphalt has a temperature of about 500° F.

4. A method according to claim 1 wherein Step A comprises mixing particulate rubber with asphalt at a temperature of about 500° F. such that the rubber is no longer particulate and is integrated into the asphalt.

5. A method according to claim 1 wherein Step A further comprises i) combining the asphalt and solid rubber particles in a vessel, ii) circulating at least a portion of the asphalt and rubber particle mixture from a middle or upper portion of the vessel into a bottom portion of the vessel through jet spray nozzles.

6. A method according to claim 1 wherein Step B comprises mixing the rubber modified asphalt cement with an emulsification solution, said emulsification solution comprising i) water, ii) an anionic, cationic or nonionic emulsifier and iii) at least one additional component selected from the group consisting of components consisting of: polymer latexes, thickeners, pH adjusting agents, pH stabilizing agents, anti-foam agents, carbon black, coloring agents, surfactants and fillers.

7. A method according to claim 1 wherein the solid rubber particles used in Step A are non-swelled.

8. A method according to claim 1 wherein the solid rubber particles used in Step A have not been dispersed in or mixed with a solvent.

9. A method according to claim 1 wherein Step B comprises passing the rubber modified asphalt cement, water and emulsifier through a colloid mill to prepare the emulsion.

10. A method according to claim 9 wherein Step B comprises pre-dispersing the Rubber modified asphalt cement in a dispersing vessel and subsequently passing the mixture through a colloid mill to further shear and disperse the Rubber modified asphalt cement.

11. A method according to claim 10 wherein Step B further comprises recirculating the mixture from the colloid mill back through the dispersing vessel and again through the colloid mill at least one time.

12. A method according to claim 1 wherein at the beginning of Step B the temperature of the Rubber modified asphalt cement is about 310–375° F. and the temperature of the water is about 80–120° F.

13. A method according to claim 1 wherein the water and at least one emulsifier are combined in an emulsifying solution, said emulsifying solution being subsequently combined with the rubber modified asphalt in Step B, wherein at the beginning of Step B the temperature of the emulsification solution is about 80–120° F.

14. A method according to claim 1 wherein the emulsifier is anionic and the resultant nonthixotropic aqueous emulsion is anionic.

15. A method according to claim 1 wherein the emulsifier is cationic and the resultant nonthixotropic aqueous emulsion is cationic.

16. A method according to claim 1 wherein the emulsifier is nonionic and the resultant nonthixotropic aqueous emulsion is nonionic.

17. A paving composition comprising a non-thixotropic aqueous rubber modified asphalt cement emulsion mixed with a quantity of aggregate, wherein the aqueous rubber modified asphalt cement emulsion is prepared by a method that comprises the steps of:

A. preparing a rubber modified asphalt cement by combining 45 to 90% by weight asphalt with 10 to 55% by weight solid rubber particles under conditions that cause at least a substantial portion of the solid rubber to become liquified so that the resultant rubber modified asphalt contains no more than about 2% by weight residual solid rubber; and B. mixing the rubber modified asphalt cement from Step A at a temperature of at least 310° F. with water and at least one emulsifying agent under conditions which result in formation of an emulsion.

18. A paving composition according to claim 17 wherein the non thixotropic aqueous rubber modified asphalt cement emulsion is mixed with approximately 12–35 pounds of aggregate per gallon of emulsion.

19. A paving composition according to claim 17 wherein the aggregate is Type I, Type II or Type II aggregate.

20. A method according to claim 1 wherein the resultant emulsion contains 45–65% by weight rubber modified asphalt cement, 21.3–52.95% by weight water, 2–6% by weight emulsifier, 0.05–0.2% by weight NaOH, 0–0.5% by weight surfactant, 0–4% by weight polymer latex and 0–3% by weight thickening agent.

21. A method according to claim 1 wherein the emulsifying agent used in Step B comprises a lignin based emulsifier.

* * * * *